United States Patent [19]

Bilgutay et al.

[11] 3,852,574

[45] Dec. 3, 1974

[54] DIGITAL RATE METER

[76] Inventors: Aydin M. Bilgutay, 7424 W. Shore Dr., Minneapolis, Minn. 55424; Ilhan M. Bilgutay, 2601 Sunset Blvd., Minneapolis, Minn. 55416

[22] Filed: Nov. 6, 1972

[21] Appl. No.: 304,021

[52] U.S. Cl......... 235/92 PL, 235/92 R, 235/92 CC, 235/92 FQ

[51] Int. Cl. ............................................ H03k 21/34

[58] Field of Search....... 235/92 CC, 92 PL, 92 DE, 235/92 FQ, 92 TF, 92 MB

[56] References Cited

UNITED STATES PATENTS

| | | | |
|---|---|---|---|
| 3,586,835 | 6/1971 | Foeh | 235/92 PC |
| 3,632,996 | 1/1972 | Paine | 235/92 CC |
| 3,636,336 | 1/1972 | Everett | 235/92 DE |
| 3,661,147 | 5/1972 | Mason | 128/2.05 T |
| 3,714,645 | 1/1973 | Sivertson | 235/92 FQ |

*Primary Examiner*—Gareth D. Shaw
*Assistant Examiner*—Robert F. Gnuse
*Attorney, Agent, or Firm*—Wayne A. Schwartz; Wayne A. Sivertson

[57] ABSTRACT

A digital rate meter capable of determining, in the shortest possible time, the frequency of a repeatable function to any desired accuracy. The meter consists essentially of a clock pulse generator, a down counter, a monostable multivibrator and output devices which may include a storage register, display means and any necessary decoding apparatus. Each signal into the monostable multivibrator triggers it thereby producing a trigger pulse whose pulse length determines the maximum frequency which can be read by the meter. The falling edge of the trigger pulse re-sets the down counter to a value corresponding to the maximum frequency. Thereafter, the down counter counts down in response to pulses from a clock pulse generator until a second signal is applied to the monostable multivibrator. Upon the occurrence of a second signal, a second trigger pulse is generated whose rising edge causes the count of the down counter to be transferred to the output devices as a direct frequency reading.

13 Claims, 5 Drawing Figures

DIGITAL RATE METER

BACKGROUND OF THE INVENTION

There are many prior art rate meters. Generally, these meters employ sampling techniques, require analog-to-digital or digital-to-analog conversion or operate on an integration principle. Still others follow mechanical approaches. They usually depend on averaging or sampling techniques and share the common failing that they are not capable of directly reading the rate of any changing function continuously from period to period.

BRIEF SUMMARY OF THE INVENTION

The rate meter of the present invention is one which is capable of directly determining the frequency of any repeatable function from one period to another. It provides a digital readout from either a digital or analog input and its time unit may be preselected as desired. Further, it may be operated to any degree of accuracy without sacrificing speed or range of operation.

The essential elements of the present invention are a clock pulse generator, a downcounter, a monostable multivibrator and any desired output devices — including display devices. A signal applied to the input of the monostable multivibrator causes a trigger signal to be generated whose pulse length corresponds to the period of a repeatable function whose frequency is the maximum which is desired to be read. The falling edge of the trigger signal re-sets the down counter to a count equal to the maximum frequency and the downcounter then begins to count down in response to pulses from the clock pulse generator. Upon the application of a second signal to the input of the monostable multivibrator - after one period of the repeatable function, for example - a second trigger signal is generated whose rising edge causes the count of the downcounter to be transferred to the output devices. The falling edge of the trigger signal again re-sets the down counter to the maximum frequency which again begins to count down in response to pulses from the clock pulse generator. To the extent that the time between clock pulses corresponds to the differences in period from one frequency to the next, the count of the downcounter will be an accurate representation of actual frequency. This accuracy is attained by the rate meter of the present invention by operating on the clock pulse generator such that its clock pulses are produced in a non-linear fashion to provide any desired degree of accuracy.

DETAILED DESCRIPTION OF THE DRAWINGS

Figure 1:
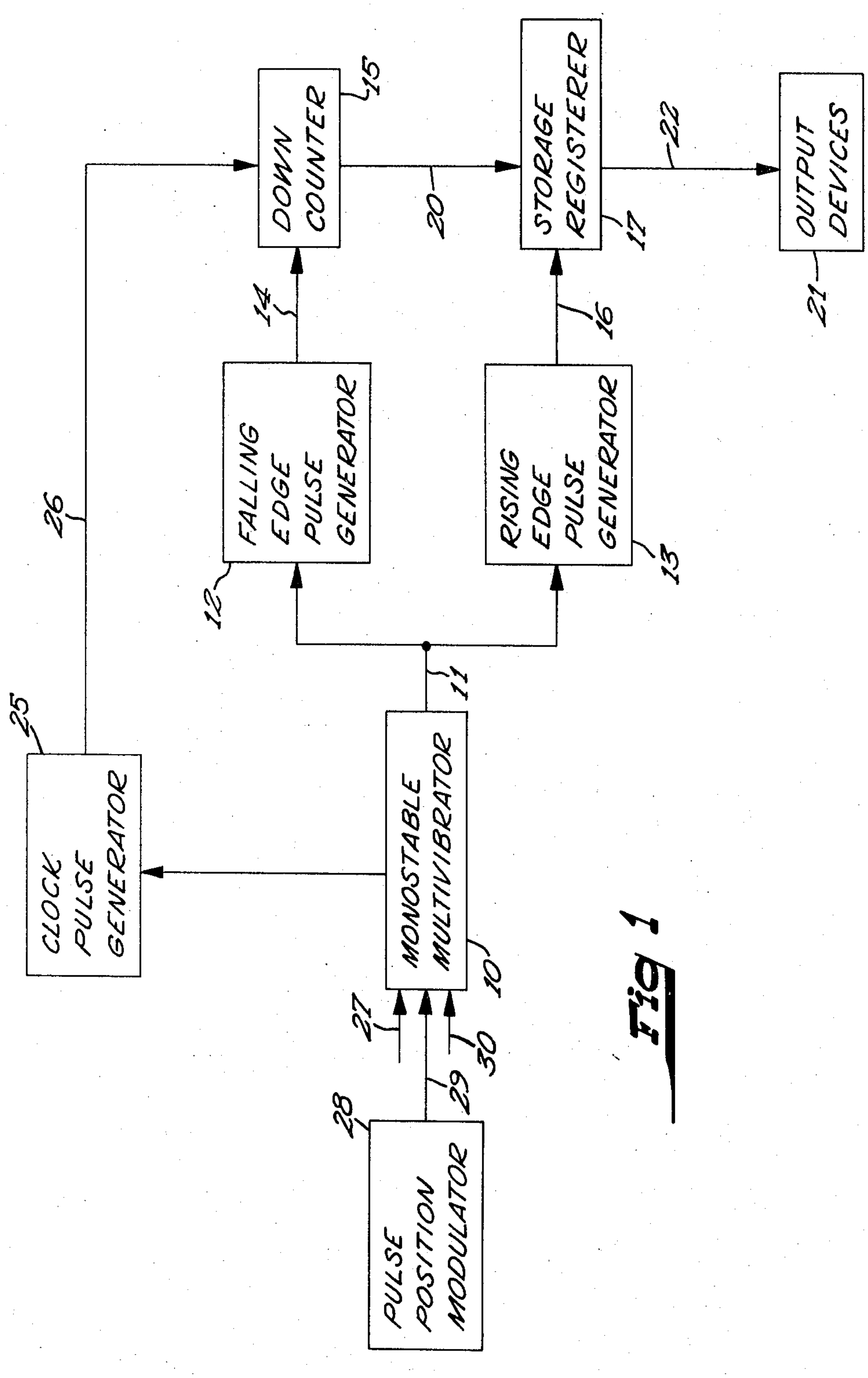
FIG. 1 shows a block diagram of a preferred embodiment of the digital rate meter of the present invention.

FIG. 1, which illustrates a preferred embodiment of the present invention, shows a monostable multivibrator 10 whose output is connected by a line 11 to a falling edge pulse generator 12 and a rising edge pulse generator 13. The output of the falling edge pulse generator 12 is conducted by a line 14 to a downcounter 15 while the output of the rising edge pulse generator 13 is conducted by a line 16 to a storage register 17. The downcounter 15 is connected to the storage register 17 by a line 20 and the storage register 17 is connected to the output devices 21 by a line 22. The output of the monostable multivibrator 10 is also connected by a line 24 to a clock pulse generator 25 which in turn is connected to the downcounter 15 by a line 26.

If the desired input to the system is in digital and logic compatible form, the input information is applied directly to the input of the monostable multivibrator 10 on the line 27. In some situations, amplification or pulse shaping may be required and these may be accomplished in any known fashion. If the input to the system is in analog form, the signal is first applied to a pulse position modulator 28 whose output is connected to the monostable multivibrator 10 by a line 29. The pulse position modulator 28 is a free running multivibrator whose frequency depends upon the applied reference analog signal. In addition to the digital and analog inputs discussed above, this system is also capable of accepting manual entry signals as an input such as those produced by a pushbutton switch, for example, with this manual input being applied to the monostable multivibrator 10 by the line 30.

All of the components shown in blocks in FIG. 1 are known in the prior art. For example, the down counter 15 may be a plurality of down-decade counters connected in cascade configuration to represent the tenth, hundredth and thousandth digit, as required. The output devices may take the form of known numeric displays and incorporate the necessary decoders in a manner known to the prior art. Pulse position modulator 28, monostable multivibrator 10, rising edge pulse generator 13 and falling edge pulse generator 13 are all known in the art. Dependent upon the selection of particular ones of these and other devices employed herein, it may be necessary to provide an inverter in one or more of the connecting lines. This determination is one well known to the prior art and the selection of certain prior art devices for use in the rate meter disclosed herein and the use of an inverter with the selected device are within the scope and teaching of the present invention. Also, in some instances only one connecting line may be shown where more than one is necessary or more than one may be shown for the purpose of illustration when only one is required. It is to be understood that the connecting lines shown are shown for illustration only and that the number of lines shown are not intended as a limitation to the invention.

In operation, the digital rate meter of FIG. 1 operates as follows. A first input signal to the monostable multivibrator 10, from whatever source, triggers it causing it to produce a trigger signal whose pulse length is equal to the period of a repeatable function whose frequency is the highest which is desired to be read. This frequency, of course, will depend on the particular application. On the rising edge of the trigger signal, rising edge pulse generator 13 applies a signal to the storage register 17 which acts as a clock pulse for the storage register 17 causing it to accept the output of the down counter 15 which is then transferred by line 22 to the output devices 21. The falling edge of the trigger signal from the monostable multivibrator 10 causes the falling edge pulse generator 12 to generate a pre-set pulse to the down counter 15. The down counter 15 is re-set to the count corresponding to the frequency whose period is equal to the pulse length of the trigger signal. Thereafter, and until another input to the monostable multivibrator 10 produces a second trigger signal, the down counter 15 will count down in response to clock pulses from clock pulse generator 25. To the extent that the time between clock pulses corresponds to the increase in period from one frequency per time unit to the next, the count of the down counter will be an accurate representation of frequency at the time that another input signal to the monostable multivibrator 10 causes the count of the down counters to be transferred to the storage register 17. It is apparent, however, that a linear clock pulse applied to the down counter 15 will quickly lose all relation to actual frequency and that some type of non-linearity must be accomplished to achieve any degree of accuracy at all.

Figure 2:
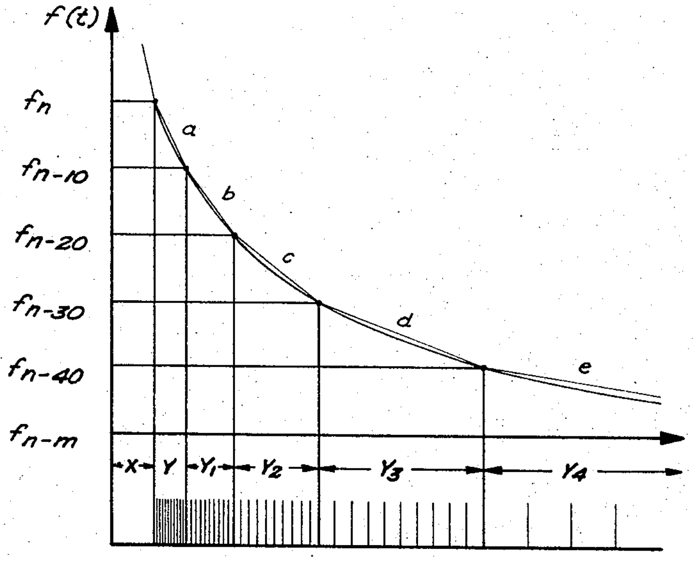
FIG. 2 shows a frequency versus period curve.

The accuracy of the rate meter of the present invention is predicated upon its ability to accomplish the desired non-linearity in the clock pulses by approximating a frequency versus period curve such as that shown in FIG. 2. Essentially, this curve is hyperbolic in that frequency and period are inversely proportional. The desired approximation is accomplished by establishing a maximum frequency to be read, such as that shown in FIG. 2 as $f_n$, for example. This frequency is dependent upon the frequency range under consideration. It is known that a frequency of $f_n$ will have a period between pulses as shown by X in FIG. 2. It is also known that a frequency of 10 cycles per time unit less than $f_n$ will have a period between pulses which exceeds X by the amount shown as $Y_O$ in FIG. 2. Therefore, assuming that $f_n$ is the maximum frequency which is desired to be read, a frequency between $f_n$ and $f_{n-10}$ can be read approximately by down counting from $f_n$ at each time interval which corresponds to 1/10 of the time period $Y_O$ until the occurrence of a second input pulse. If the second input pulse has not occurred during the time X + $Y_O$, a second time period $Y_1$ corresponding to the period increase from $f_n$-10 to $f_{n-20}$ is divided similarly into ten equal units and the down counter counts down in response to clock pulses which occur at 1/10 of this second interval. This technique can be extended for as many time segments as are desired as represented by the time periods $Y_O$, $Y_1$, . . . $Y_n$ in FIG. 2. It should be noted, that as the frequency decreases the period increases and therefore the clock pulses occur at longer time intervals from each other. It is also apparent that the approximation described herein can be made more accurate either by dividing the time periods $Y_O$, $Y_1$, . . . $Y_n$ into more than 10 parts or by having the time periods $Y_O$, $Y_1$, . . . $Y_n$ correspond to less than a 10 cycle per time unit frequency difference — one cycle per frequency unit for example — or both. Through either approach, it can be seen from FIG. 2 that any frequency lower than the maximum desired frequency $f_n$ can be as closely approximated as desired. It is also apparent that this technique provides an approximation only at frequencies which fall within the intervals $Y_O$, $Y_1$, $Y_2$, . . . $Y_n$. That is, if a second input pulse should occur at the time X + $Y_O$ after the first, it would occur at the time that the line segment *a* is directly upon the frequency versus period curve and the reading would be accurate.

Figure 3:
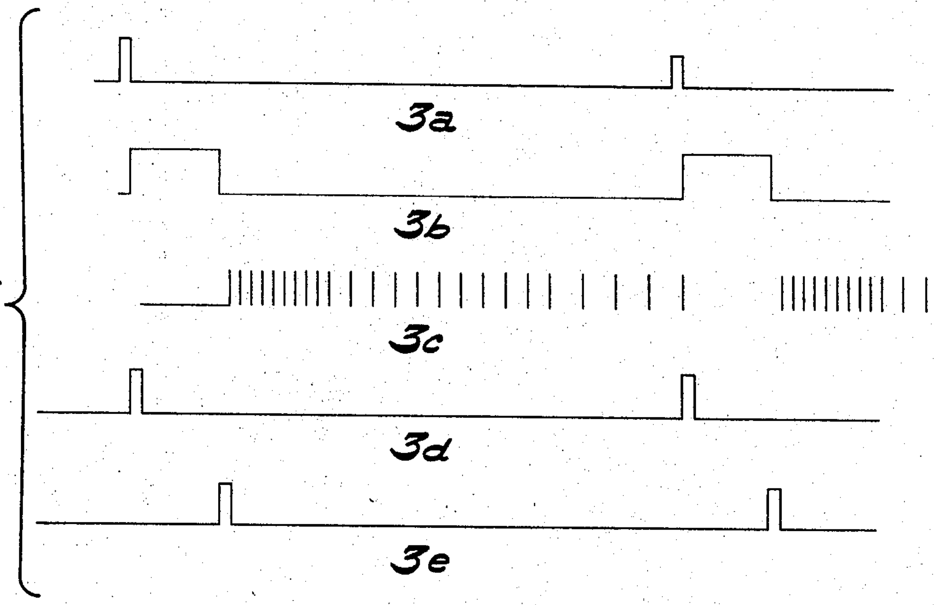
FIG. 3 is a timing diagram for the digital rate meter of FIG. 1.

Referring now to FIG. 3, there is shown a timing diagram for the digital rate meter of FIG. 1 in which the clock pulse generator is compensated in the manner described with reference to FIG. 2. Line 3(*a*) illustrates input pulses to the monostable multivibrator 10 applied to its input by any of the lines 27, 29 or 30. The pulse generated by the monostable multivibrator 10 is illustrated in Line 3(*b*). Its rising edge causes the rising edge pulse generator 13 to produce a signal as shown on Line 3(*d*) while its falling edge causes the falling edge pulse generator 12 to produce a signal as shown on Line 3(*e*). The monostable multivibrator, pulse falling edge also re-sets the clock pulse generator 25 such that it begins generating clock pulses as shown in Line 3(*c*).

The operation of the digital rate meter in terms of the timing diagram of FIG. 3 is as follows. A first input pulse (Line 3(*a*)) causes the monostable multivibrator 10 to generate a trigger signal (Line 3(*b*)) whose pulse length is equal to the period of the repeatable function whose frequency is the maximum which is desired to be determined. The rising edge of the trigger signal causes the rising edge pulse generator 13 to produce a pulse (Line 3(*d*)) which pulse is applied to the storage register 17 causing it to accept the count of the down counter 15. The falling edge of the trigger signal causes the falling edge pulse generator 12 to produce a pulse (Line 3(*e*)) which pulse is applied to the down counter 15 causing it to be re-set to a count equal to the maximum frequency which is desired to be determined. The falling edge of the trigger signal (Line 3(*b*)) is also applied to the clock pulse generator 25 causing it to be re-set and to produce a train of signals as shown on Line 3(*c*). The signals shown in Line 3(*c*) represent ideal conditions. The first of the signals could be produced at any time between the falling edge of the trigger signal and the first of the signals shown on Line 3(*c*). Thus, the rate meter of the present invention has an inherent inaccuracy. This condition can be ameliorated by increasing the number of pulses per time period and/or decreasing the time period as described above. In addition, a multivibrator within the clock pulse generator which is capable of being re-set upon the falling edge of the trigger signal would eliminate this inaccuracy in its entirety. The clock pulse generator continues to produce signals in the manner described with reference to FIG. 3 until such time as a second input pulse is applied to the monostable multivibrator 10 (Line 3(*a*)). The second pulse produces a second trigger signal (Line 3(*b*)) which causes the storage register 17 to accept the count of the down counter 15 as a result of the second clock pulse (Line 3(*d*)) generated by rising edge pulse generator 13. The count of the down counter 15 is then transferred to the output devices for immediate display thereby giving a direct frequency reading.

Figures 4, 5:
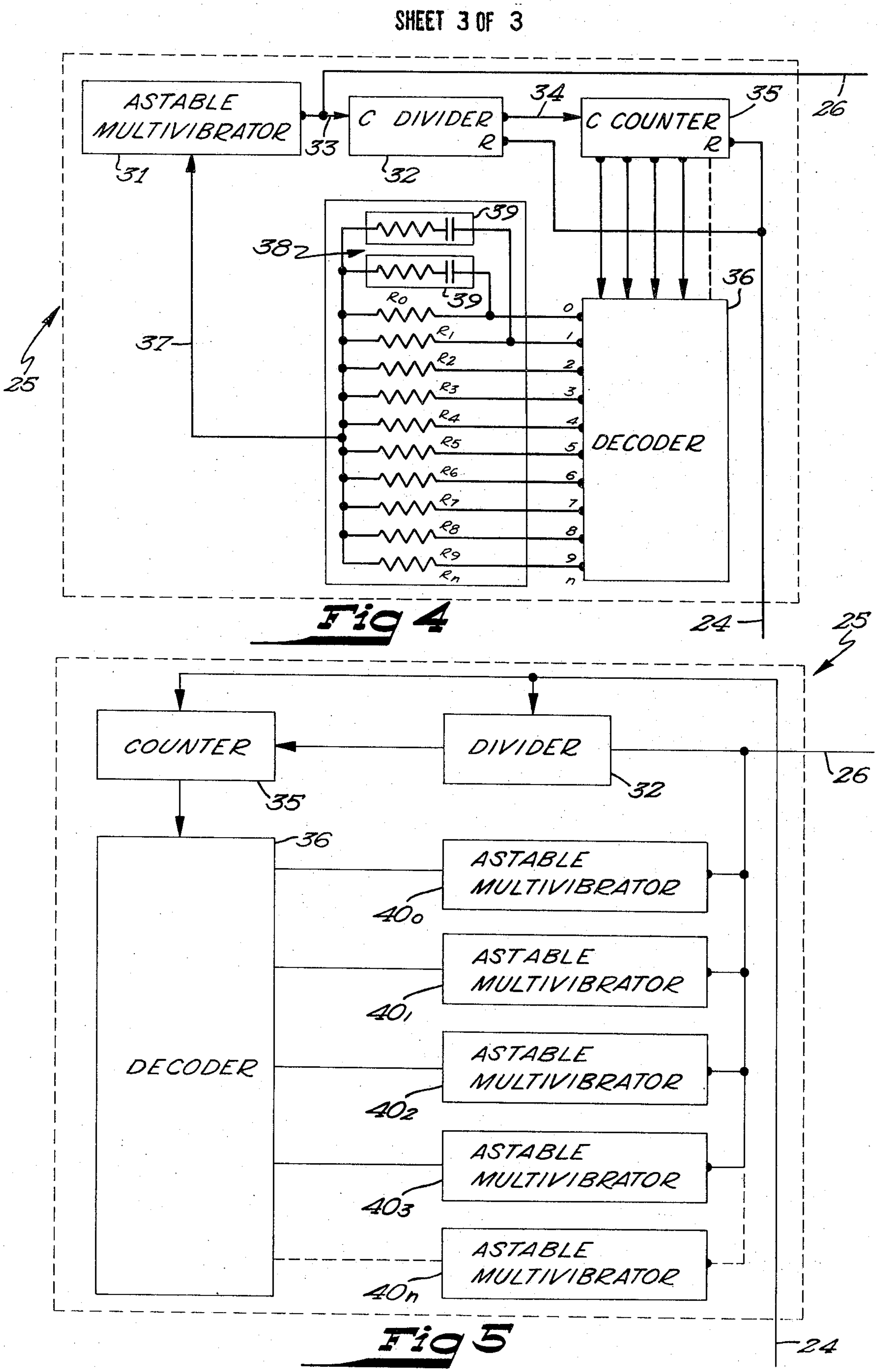
FIG. 4 is a preferred embodiment of a portion of the digital rate meter of FIG. 1.
FIG. 5 is a second preferred embodiment of a portion of the digital rate meter of FIG. 1.

Referring now to FIG. 4 there is shown a preferred manner of accomplishing the non-linearity in the clock pulse generator which non-linearity is designed to approximate the frequency versus period curve of FIG. 2. Specifically, there is shown an astable multivibrator 31 which is a free-running multivibrator of the type having an RC time constant. The output of the multivibrator 31 is applied as clock pulses to the down counter 15 by a line 26 and to a divider 32 by a line 33. The divider 32 is simply a device which generates a signal on a line 34 after a certain number of pulses have been received on the line 33. Pulses from the divider 32 are applied to a counter 35 by the line 34 which, in combination with a decoder 36, provides a switching function in known fashion. That is, upon each signal received by the counters 35, it itself generates a signal which is applied to the decoder 36 which in turn applies a signal to one of its outputs O-*n*. The outputs O-*n* of the decoder 36 are connected to a resistive network composed of resistances $R_O$ to $R_n$ with this network in turn being connected to the time constant of astable multivibrator 31 by the line 37. In operation, a re-set signal on the line 24 re-sets the divider 32 and counter 35 to the state corresponding to the maximum desired frequency. In this state, the resistance $R_O$, for example, would be connected to the RC time constant of the astable multivibrator which thereafter would generate pulses on the line 26 with the pulses having a frequency of 1/10 of the period $Y_O$ in FIG. 2. After a certain number of pulses, 10 in this example, the divider would generate a signal to the counter whose signal would be decoded by the decoder 36 thereby taking the resistance $R_O$ out of the multivibrator a time constant and substituting therefor the resistance $R_1$, for example. The difference in resistance between the resistance $R_O$ and $R_1$ would cause the frequency of pulses produced by the multivibrator 31 to change such that the pulses would have a frequency of 1/10 of the time period $Y_1$ in FIG. 2, for example. The resistance substituting process would continue until such time as another re-set pulse appears on the line 24.

To even more closely approximate the line segments *a–e* illustrated in FIG. 2, a compensation network 38 is illustrated in FIG. 4. This compensation network consists of a series-connected resistance and capacitance 39 connected in parallel with the resistances $R_O$–$R_n$. There is one for each of the resistances $R_O$–$R_n$ and the value of the components is such that the pulses generated during each time segment $Y_O, Y_1, \ldots Y_n$ are themselves non-linear in a manner that even more closely approximates the period versus frequency curve of FIG. 2.

Referring now to FIG. 5, wherein there is shown another technique for generating the required non-linear clock pulses. Specifically, there is shown a series of astable multivibrators $40_0, 40_1, 40_2, \ldots 40_n$ each of which has a frequency corresponding to 1/10 of a different one of the time segments $Y_0, Y_1, Y_2, \ldots Y_n$ in FIG. 2. This clock pulse generator is also provided with a divider 32, counter 35, and decoder 36 of the type described with reference to FIG. 4. A re-set signal appearing on line 24 causes the divider 32 and counter 35 to be re-set which in turn causes decoder 36 to make operative the appropriate astable multivibrator $40_0$ for example. After the desired number of pulses have been sensed by the divider 32, a signal is applied to the counter 35 and then to the decoder 36 to cause a change in which of the multivibrators 40 is operative that change being dependent upon the portion of the curve which is to be approximated. These clock pulses from any of the astable multivibrators 40 are applied to the line 26 and then to the down counter 15 as described above with reference to FIG. 4.

From the above, it is apparent that the digital rate meter of the present invention is capable of approximating to any desired degree the frequency versus time curve as shown in FIG. 2 and thereby give a direct frequency reading based upon a signal period measurement. It is also apparent that many modifications are possible in light of the teachings contained herein. For example, a gate may be placed within the line 26 to block the clock pulses from the down counter 15 on the rising edge of the trigger pulse from the monostable multivibrator 10. With such a blocking gate in place, it would be possible to eliminate the storage register 17 and have the output device display directly the count of the down counter as it counts down. Further, the frequency range over which a particular rate meter is operative could be increased by placing a divider on the input of the monostable multivibrator 10. One would then simply multiply the output of the rate meter by the ratio of the divider to determine frequency. Similarly, a divider could be placed within the line 16 so that the rate meter would give a frequency reading of every tenth period in the pulse train, for example, the exact figure being dependent upon the ratio of the divider inserted. Finally, in some applications it may be desirable to produce an output indicative of the fact that an input has been applied to the monostable multivibrator 10. This can be accomplished by connecting the output devices 21 directly to the monostable multivibrator 10 in a manner such that the output devices will give a display indicative of the fact that an input has been applied to the monostable multivibrator 10.

The novel digital rate meter disclosed herein has many practical applications. One of the prime applications is in the medical-electronic field wherein the heartbeat can be read continuously from one beat to another. This enables a doctor or the patient to follow or monitor each heartbeat thereby giving an indication of pulse rate as well as providing the potential to disclose an irregular heartbeat. This may be particularly advantageous to persons whose heart is paced electrically by any of the many known devices for that purpose. Further, the rate meter of the present invention can be incorporated with a light emitting diode dot matrix display to monitor the R waves of a heartbeat in its natural form. This would make it possible for the first time to have a monitor usable by a patient at a cost which he himself can afford. The compatibility of the rate meter disclosed herein to operate on analog signals which have been represented in digital form by a pulse position modulator allow the rate meter to be used in many industrial applications among which are volt meters, amp meters, ohm meters, digital temperature readout meters, pressure, flow, weight and speed meters and many others. Any one of these uses would dictate the type of displayed device which is required. The selection of the particular display, however, is within the expertise of the particular art.

Obviously, many modifications and variations of the present invention are possible in light of the above teachings. It is therefore to be understood that, within the scope of the appended claims, the invention may be practiced otherwise than as specifically described.

What is claimed is:

1. In a digital rate meter for approximating the frequency of a repeatable function, the repeatable function frequency being lower than a first predetermined frequency, of the type having clock pulse generator means and register means responsive to said clock pulse generator means, the improvement which comprises:

said clock pulse generator means being selectively sequentially operable at first and successive clock pulse repetition rates, said first repetition rate being substantially equal to 1/n times the increase in period resulting from a decrease in frequency from said first predetermined frequency to a second lower frequency, *n* being a constant number greater than 1, with said successive repetition rates being substantially equal to 1/n times the increase in period from successive decreases in frequency, each successive decrease in frequency being substantially equal to the decrease in frequency from said first predetermined frequency to said second lower frequency; and means responsive to said clock pulse generator means for sequentially switching said clock pulse generator means from said first repetition rate through said successive repetition rates, said switching being effected after n pulses at each repetition rate.

2. The digital rate meter improvement of claim 1 wherein said clock pulse generator means comprises:

pulse generator means of the type having an RC time constant; and network means having a plurality of time constant altering means each independently connectable to said pulse generator time constant;

said means for sequentially switching comprising switch means for sequentially connecting a different one of said time constant altering means to said pulse generator time constant after n pulses have been generated by said pulse generator means.

3. The digital rate meter improvement of claim 2 wherein each of said time constant altering means comprises first resistance means.

4. The digital rate meter improvement of claim 3 wherein each of said time constant altering means further comprises serially connected capacitances and second resistance means connected in parallel with said first resistance means.

5. The digital rate meter improvement of claim 4 wherein said register means comprises down-counter means, the improvement further comprising means for presetting said down-counter means to a count substantially equal to said first predetermined frequency.

6. The digital rate meter improvement of claim 5 wherein n equals the difference in frequency between said first predetermined frequency and said second lower frequency.

7. The digital rate meter improvement of claim 1 wherein said clock pulse generator means comprises a plurality of pulse generator means each having a pulse repetition rate corresponding to one of said first and successive repetition rates, each of said pulse generator means being selectively connectable to said register means and said sequentially switching means comprising means for connecting a different one of said pulse generator means to said register means after the connected pulse generator means has generated n pulses.

8. The digital rate meter improvement of claim 7 wherein said register means comprises down-counter means, the improvement further comprising means for presetting said down-counter means to a count substantially equal to said first predetermined frequency.

9. The digital rate meter improvement of claim 8 wherein n equals the difference in frequency between said first predetermined frequency and said second lower frequency.

10. A method of approximating the frequency of a repeatable function which comprises the steps of:

a. establishing a first frequency greater than the frequency range of repeatable functions to be measured;

b. establishing a second frequency lower than said first frequency;

c. generating a control signal at a time after an occurrence of said repeatable function equal to the period of said first frequency;

d. generating n signals at intervals substantially equal to the difference in period between said first and second frequencies divided by *n*, *n* being a constant number greater than 1;

e. repeating step (d) with the second frequency substituted for the first frequency and a third frequency substituted for said second frequency, said third frequency being lower than said second frequency by an amount equal to the amount by which the second frequency is lower than said first first frequency;

f. repeating step (e) until the reoccurrence of said repeatable function; and g. registering the total number of signals generated after said control signal until the reoccurrence of said repeatable function.

11. The method of claim 10 wherein the step of registering comprises the step of counting down from a predetermined number in response to said signal, said predetermined number being the frequency of said first frequency.

12. The method of claim 11 wherein *n* equals the difference in frequency between said first and second frequency, the step of generating n signals comprising the steps of generating signals at intervals equal to the difference in period between said first and second frequencies divided by the difference in frequency between said first and second frequency.

13. A digital rate meter for approximating the frequency of a repeatable function, the repeatable function frequency being lower than a first predetermined frequency, which comprises;

clock pulse generator means selectively sequentially operable at first and successive clock pulse repetition rates, said first repetition rate being substantially equal to 1/*n* times the increase in period resulting from a decrease in frequency from said first predetermined frequency to a second lower frequency, *n* being a constant number greater than 1, with said successive repetition rates substantially equal to 1/*n* times the increase in period from successive decreases in frequency, each successive decrease in frequency being substantially equal to the decrease in frequency from said first predetermined frequency to said second lower frequency;

means for counting down from a predetermined count equal to the frequency of said first predetermined frequency in response to pulses from said clock pulse generator means;

storage means connected to said down counting means;

input means including a monostable multivibrator, the pulse length of said monostable multivibrator being equal to the period of said first predetermined frequency;

means for generating a storage means closk pulse upon the rising edge of a pulse from said monostable multivibrator, said storage means clock pulse being applied to said storage means for causing it to accept the count of said down counting means;

means for generating a down counting means pre-set pulse upon the falling edge of a pulse from said monostable multivibrator, said down counting means pre-set pulse being applied to said down counting means to pre-set it to said predetermined count; and means responsive to said clock pulse generator means for sequentially switching said clock pulse generator means through said successive repetition rates, said switching being effected after n pulses at each repetition rate.

* * * * *